(12) United States Patent
Verghese et al.

(10) Patent No.: US 8,021,586 B2
(45) Date of Patent: *Sep. 20, 2011

(54) AMPHIPHILIC BLOCK COPOLYMER-TOUGHENED EPOXY RESINS AND POWDER COATINGS MADE THEREFROM

(75) Inventors: Kandathil E. Verghese, Lake Orion, MI (US); Marcos P. Franca, Sao Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/663,803

(22) PCT Filed: Nov. 2, 2005

(86) PCT No.: PCT/US2005/039966
§ 371 (c)(1),
(2), (4) Date: Dec. 26, 2007

(87) PCT Pub. No.: WO2006/052730
PCT Pub. Date: May 18, 2006

(65) Prior Publication Data
US 2008/0188626 A1 Aug. 7, 2008

Related U.S. Application Data

(60) Provisional application No. 60/626,612, filed on Nov. 10, 2004.

(51) Int. Cl.
*B29C 47/88* (2006.01)

(52) U.S. Cl. ........... 264/211.12; 264/176.1; 264/211.24; 428/413; 525/403; 525/407; 525/409; 525/523; 525/934

(58) Field of Classification Search .................. 525/407, 525/403, 409, 523, 934; 264/176.1, 211.12, 264/211.24; 428/413
See application file for complete search history.

(56) References Cited

U.S. PATENT DOCUMENTS

| | | |
|---|---|---|
| 3,804,735 A | 4/1974 | Radlove et al. |
| 3,892,819 A | 7/1975 | Najvar |
| 3,948,698 A | 4/1976 | Elrick et al. |
| 4,014,771 A | 3/1977 | Rosenkranz et al. |
| 4,119,609 A | 10/1978 | Allen et al. |
| 4,431,782 A | 2/1984 | Harris et al. |
| 5,508,349 A * | 4/1996 | Clark et al. ............... 525/124 |
| 5,600,019 A | 2/1997 | Bhattacharjee et al. |
| 6,887,574 B2 * | 5/2005 | Dean et al. ............... 428/416 |

FOREIGN PATENT DOCUMENTS

| | | | |
|---|---|---|---|
| JP | 56-28253 | * | 3/1981 |
| JP | H9-324110 | | 12/1997 |
| WO | WO 2005/097893 | * | 10/2005 |

OTHER PUBLICATIONS

Schillen, Karin, et al., J. phys. Chem. B, 1997, 101(21), 4238-4252.*
Fink, Johannes Karl, Oil Field Chemicals, 2003, Gulf Professional Publishing, p. 277.*
Tyger Scientific, Product data sheet [online], accessed via the Internet [retrieved on Mar. 10, 2009], URL: <http://www.tygersci.com/tyger/UVR-6105.html>.*
Choucair, A.; Eisenberg, A.; The European Physical Journal E, vol. 10, p. 37-44, 2003.*
Journal of the American Chemical Society, 1997, 119(11), 2749-2750.
Journal of Applied Polymer Science, 1994, 54, 815.
Journal of Polymer Science, Part B: Polymer Phusics, 2001, 39(23), 2996-3010.
Lee and Neville, Handbook of Epoxy Resins, Chapter 2, McGraw Hill, N.Y. (1967).
Macromolecules, 2000, 33(26), 9522-9534.
Macromolecules, 2000, 33, 5235-5244.
Macromolecules 2002, 35, 3133-3144.
Whitmarsh, R.H. In Nonionic Sufactants Polyoxyalkylene Block Copolymers; Nace, V.M., Ed.; Surfactant Science Series; vol. 60; Marcel Dekker, N.Y., 1996, Chapter 1.

* cited by examiner

*Primary Examiner* — David W Wu
*Assistant Examiner* — Robert Jones, Jr.

(57) ABSTRACT

A curable resin composition and powder coating compositions made therefrom including (a) an epoxy resin; (b) an amphiphilic block copolymer containing at least one epoxy resin miscible block segment and at least one epoxy resin immiscible block segment; wherein the immiscible block segment comprises at least one polyether structure provided that the polyether structure of said immiscible block segment contains at least one or more alkylene oxide monomer units having at least four carbon atoms; such that when the epoxy resin composition is cured, the toughness of the resulting cured epoxy resin composition is increased; and (c) at least one curing agent required for the manufacturing, application and proper performance of the powder coating. The amphiphilic block copolymer is preferably an all polyether block copolymer such as a PEO-PBO diblock copolymer or a PEO-PBO-PEO triblock copolymer.

18 Claims, 1 Drawing Sheet

AMPHIPHILIC BLOCK COPOLYMER-TOUGHENED EPOXY RESINS AND POWDER COATINGS MADE THEREFROM

CROSS REFERENCE TO RELATED APPLICATION

This application is a 371 of PCT/US2005/039966 filed Nov. 11, 2005, which claims the benefit of U.S. Provisional Application Ser No. 60/626612 filed Nov. 10, 2004.

The present invention relates to epoxy resin powder coating compositions modified with amphiphilic polyether block copolymers to increase the fracture resistance or toughness of the cured powder coating composition.

Epoxy resins are typically cured with hardeners or curing agents, and when cured, the resins are known for their thermal and chemical resistance. The cured epoxy resins also display good mechanical properties but they lack toughness and tend to be very brittle upon cure. The lack of toughness of the resins is especially true as the crosslink density or Tg of the resins increases.

Recently, there have been several studies related to increasing the fracture resistance or toughness of epoxy resins by adding to the epoxy resin various block copolymers. Much of the previous work is focused on the use of amphiphilic diblock copolymers having an epoxy miscible block and an epoxy immiscible block in which the epoxy miscible block is poly(ethylene oxide) (PEO) and the immiscible block is a saturated polymeric hydrocarbon. Although effective at providing templated epoxies with appealing property sets, the known block copolymer materials are too expensive to be used in some applications.

For example, Journal of Polymer Science, Part B: Polymer Physics, 2001, 39(23), 2996-3010 describes the use of a poly (ethylene oxide)-b-poly(ethylene-alt-propylene) (PEO-PEP) diblock copolymer to provide micellar structures in cured epoxy systems and that block copolymers self-assembled into vesicles and spherical micelles can significantly increase the fracture resistance of model bisphenol A epoxies cured with a tetrafunctional aromatic amine curing agent. And, Journal of the American Chemical Society, 1997, 119(11), 2749-2750 describes epoxy systems with self-assembled microstructures brought using amphiphilic PEO-PEP and poly(ethylene oxide)-b-poly(ethyl ethylene) (PEO-PEE) diblock copolymers. These block copolymer-containing systems illustrate characteristics of self-assembly.

Other block copolymers incorporating an epoxy-reactive functionality in one block have been used as modifiers for epoxy resins to achieve nanostructured epoxy thermosets. For example, Macromolecules, 2000, 33(26), 9522-9534 describes the use of poly(epoxyisoprene)-b-polybutadiene (BIxn) and poly(methylacrylate-co-glycidyl methacrylate)-b-polyisoprene (MG-I) diblock copolymers that are amphiphilic in nature and are designed in such a way that one of the blocks can react into the epoxy matrix when the resin is cured. Also, Journal of Applied Polymer Science, 1994, 54, 815 describes epoxy systems having submicron scale dispersions of poly(caprolactone)-b-poly(dimethylsiloxane)-b-poly(caprolactone) triblock copolymers.

While some of the previously known diblock and triblock copolymers mentioned above are useful for improving the toughness of epoxy resins, the preparation of such previously known block copolymers is complicated. The previously known block copolymers require multiple steps to synthesize and therefore are less economically attractive from a commercial standpoint.

Still other self-assembled amphiphilic block copolymers for modifying thermosetting epoxy resins to form nanostructured epoxy thermosets are known. For example, Macromolecules, 2000, 33, 5235-5244 and Macromolecules 2002, 35, 3133-3144, describe the addition of a poly(ethylene oxide)-b-poly(propylene oxide) (PEO-PPO) diblock and a poly(ethylene oxide)-b-poly(propylene oxide)-b-poly(ethylene oxide) (PEO-PPO-PEO) triblock to an epoxy cured with methylene dianiline, where the average size of the dispersed phase in the diblock-containing blends is of the order of 10-30 nm. And, a polyether block copolymer such as a PEO-PPO-PEO triblock is also known to be used with an epoxy resin as disclosed in Japanese Patent Application Publication No. H9-324110.

Japanese Application Publication No. 56-28253 discloses the possible use of a block copolymer of a ethylene oxide and propylene oxide for an epoxy/anhydride powder coating system, but does not disclose the use of an amphiphilic polyether block copolymer or any benefits thereof.

An epoxy resin composition such as a solid epoxy resin (SER) supplied to the fusion bonded epoxy (FBE) powder coatings industry is excellent at providing corrosion protection to articles such as metal pipe. However, key draw-backs inherent to the epoxy system are its lack of flexibility and abrasion resistance. Therefore, there is still a need to enhance the toughness of epoxy resins used in powder coatings applications while maintaining all other crucial properties such as modulus and Tg of the resulting powder coating.

It is therefore desired to provide an alternative amphiphilic block copolymer (preferably one which has an elastomeric polymer as one of the components) that self assembles in the host epoxy resin on a nanometer size scale and that is useful for improving the toughness of epoxy resins without any of the disadvantages of the previously known block copolymers.

It is also desired to provide a thermosetting epoxy resin composition for use as a powder coating composition that provides a higher flexible coating while maintaining its other beneficial properties.

It is also an objective of the present invention to provide a modified SER for use in powder coating applications.

One aspect of the present invention is directed to a curable solid resin composition for use in powder coating compositions comprising (a) an epoxy resin; and (b) an amphiphilic block copolymer containing at least one epoxy resin miscible block segment and at least one epoxy resin immiscible block segment; wherein the immiscible block segment comprises at least one polyether structure provided that the polyether structure of said immiscible block segment contains at least one or more alkylene oxide monomer units having at least four carbon atoms; such that when the epoxy resin composition is cured, the toughness of the resulting cured epoxy resin composition is increased; wherein the final resin composition is in a solid form.

One embodiment of the present invention is directed to an epoxy resin modified with an amphiphilic polyether block copolymer containing at least one epoxy resin miscible block segment and at least one epoxy resin immiscible block segment; wherein both the miscible block segment and the immiscible block segment comprises at least one polyether structure.

Another aspect of the present invention is directed to a curable powder coating composition comprising the above epoxy resin and amphiphilic polyether block copolymer including the following component: (c) at least one curing agent; wherein the final coating composition is in a solid form. The curing agent is capable of crosslinking the epoxy resin within a predetermined time and at a predetermined temperature schedule to form the solid coating composition.

As one illustration of the present invention an amphiphilic block copolymer is added to an epoxy resin. By the addition of a small amount (for example, between 1 weight percent to 10 weight percent) of an amphiphilic block copolymer to an epoxy resin, a second phase morphology that is at the nanoscale (for example, 15-25 nanometers) is created in the epoxy resin due to self assembly that imparts tremendous improvements in toughness and ductility to epoxy powder resins without adversely affecting other properties such as glass transition temperature, modulus and viscosity. Moreover, the epoxy resin powder coating material retains its appearance, which is important in certain applications. These features are useful in powder coatings applications wherein currently the epoxy resin is being challenged in terms of its cold temperature flexibility and durability.

Some of the beneficial features of using the amphiphilic polyether block copolymer of the present invention to toughen resins include, for example: (1) the self assembly characteristics of the amphiphilic block copolymer, (2) the ability of the block copolymer to assemble at a nanometer length scale, (3) the ability of the block copolymer to create a very uniform dispersion across the entire resin monomer matrix, and (4) the ability to use low loading levels of the block copolymer toughening agent to achieve toughening results.

Some of the advantages of using the amphiphilic polyether block copolymer of the present invention include, for example: (1) the ability of the block copolymer to improve toughness of the host resin without adversely affecting other key properties such as glass transition temperature, modulus and viscosity of the host resin, (2) the ability of the resin to retain certain aesthetic qualities such as appearance that is crucial in certain applications, and (3) the ability to consistently and reproducibly create morphology prior to or during the curing of the resin itself.

Figure 1:
FIG. 1 is a photograph showing five steel bars coated with a powder coating composition of the present invention which has been toughened with a toughening agent of the present invention.
Figure 2:
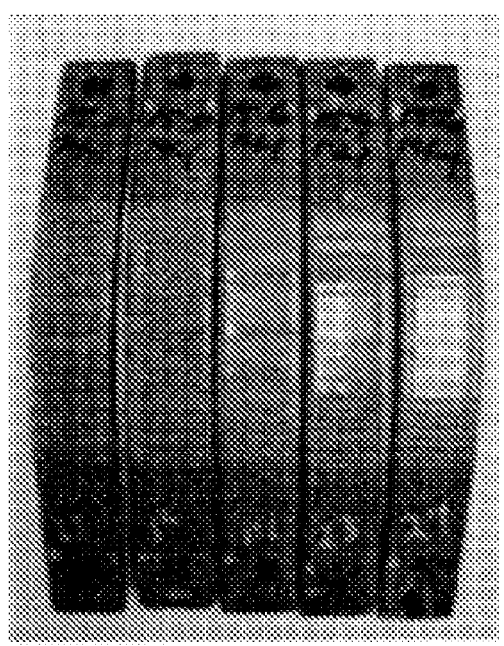
FIG. 2 (prior art) is a photograph showing five steel bars coated with a powder coating composition which has not been toughened with a toughening agent.

The present invention includes a powder coating composition with improved toughness comprising an epoxy resin monomer system modified with an amphiphilic block copolymer, such as a polyether block copolymer, as a toughening agent for the resin system. These modified epoxy resins, when cured, show impressive improvements in fracture toughness (defined by $K_{1c}$) with only minor changes in modulus and glass transition temperature (Tg) behavior.

Templated thermoset epoxy polymers with nanoscale self-assembled morphologies, exhibit an attractive combination of improved toughness and retention of material properties such as modulus and Tg. The epoxy thermoset polymers can be prepared, for example, by dispersing an amphiphilic block copolymer in a resin oligomer matrix, where the copolymer can undergo self-assembly, and then curing the resin. Self-assembled resins that exhibit surfactant-like morphologies provide enhanced fracture toughness at very low (for example, from 1 weight percent to 10 weight percent) block copolymer loadings. Amphiphilic diblock copolymers that are capable of self assembly when mixed with the resin oligomer must have at least one block that is miscible with the resin/curing agent mixture prior to cure, and at least one block that is immiscible with the resin/curing agent mixture prior to cure.

One embodiment of the present invention is aimed at preparing an all polyether block copolymer, for example, a diblock copolymer, such as those based on poly(ethylene oxide)-b-(butylene oxide) (PEO-PBO), that self assembles in epoxy resin systems. At sufficiently high butylene oxide block lengths (for example, Mn=1000 or greater) these block structures are found to be effective at templating the resin monomer into micellar structures such as spherical micelles.

The polyether block copolymer useful in the present invention includes one or more polyether block copolymers comprising at least one epoxy miscible polyether block segment derived from an alkylene oxide such as ethylene oxide (EO) and at least one epoxy immiscible polyether block segment derived from an alkylene oxide with at least greater than 3 carbon atoms, for example 1,2-epoxy butane known commonly as butylene oxide (BO). The immiscible block segment may also be comprised of mixtures of $C_4$ or higher carbon analogue monomers that are copolymerized together to provide the immiscible block segment. The immiscible block may also contain lower molecular weight co-monomers such as EO. The polyether block copolymer contains at least one epoxy resin miscible polyether block segment, E, and at least one epoxy resin immiscible polyether block segment, M.

The present invention polyether block copolymer component may contain at least two or more amphiphilic polyether block copolymer segments. Examples of the amphiphilic polyether block copolymer may be selected from the group consisting of a diblock (EM); a linear triblock (EME or EME); a linear tetrablock (EMEM); a higher order multiblock structure $(EMEM)_xE$ or $(MEME)_xM$, where X is an integer value ranging from 1-3; a branched block structure; or a star block structure; and any combination thereof. The amphiphilic polyether block copolymer consisting of the branched block structures or star block structures contains at least one epoxy monomer miscible block and at least one epoxy monomer immiscible block.

Examples of the epoxy resin miscible polyether block segment, E, include a polyethylene oxide block, a propylene oxide block, poly(ethylene oxide-co-propylene oxide) block, a poly(ethylene oxide-ran-propylene oxide) block and mixtures thereof. Preferably, the epoxy resin miscible polyether block segment useful in the present invention is a polyethylene oxide block.

Generally, the epoxy resin immiscible polyether block segment, M, useful in the present invention is an epoxidized alpha olefin having carbon atoms of from $C_4$ to $C_{20}$. Examples of the epoxy resin immiscible polyether block segment, M, include a polybutylene oxide block, a polyhexylene oxide block derived from 1,2 epoxy hexane, a polydodecylene oxide block derived from 1,2-epoxy dodecane, and mixtures thereof. Preferably, the epoxy resin immiscible polyether block segment useful in the present invention is a polybutylene oxide block.

In another embodiment of the present invention, when the polyether block copolymer has a multiblock copolymer structure, other block segments in addition to E and M may be present in the block copolymer. Examples of other miscible segments of the block copolymer include polyethylene oxide, polymethyl acrylate, and mixtures thereof. Examples of other immiscible segments of the block copolymer include polyethylene propylene (PEP), polybutadiene, polyisoprene, polydimethyl siloxane, polybutylene oxide, polyhexylene oxide, polyalkyl methyl methacrylate, such as polyethyl hexyl methacrylate, and mixtures thereof.

The amphiphilic polyether block copolymers which can be employed in the practice of the present invention include for example, but are not limited to, a diblock copolymer, a linear triblock, a linear tetrablock, a higher order multiblock structure, a branched block structure, or star block structure. For example, the polyether block copolymer may contain a poly (ethylene oxide) block, a poly (propylene oxide) block or a poly(ethylene oxide-co-propylene oxide) block; and alkylene oxide block based on a $C_4$ or higher carbon analog block, such as, for example, 1,2-epoxybutane, 1,2-epoxyhexane, 1,2-epoxydodecane, or 1,2-epoxyhexadecane block. Other examples of the alkylene oxide blocks may include Vikolox™ epoxidized alpha olefins, including C10-C30+ olefins, commercially available from Atofina.

Preferred examples of suitable block copolymers useful in the present invention include amphiphilic polyether diblock copolymers such as, for example, poly(ethylene oxide)-b-poly(butylene oxide)(PEO-PBO) or amphiphilic polyether triblock copolymers such as, for example, poly(ethylene oxide)-b-poly(butylene oxide)-b-poly(ethylene oxide) (PEO-PBO-PEO).

The amphiphilic polyether block copolymer used in the present invention can have a number average molecular weight (Mn) of from 1,000 to 30,000, for the combination of both block lengths. Most preferably, the molecular weight of the polyether block copolymer is between 3,000 and 20,000. Prior art materials derived from block copolymers in which the immiscible block has a very low solubility parameter (polymeric hydrocarbons) microphase separate prior to cure. The polyether containing block structures of the present invention, on the other hand, can either be microphase separated prior to cure at the preferred molecular weights, or form micelles while the curing process is being performed.

The composition of the block copolymer can range from 90 percent epoxy resin miscible poly alkylene oxide block and 10 percent epoxy resin immiscible polyalkylene oxide block to 10 percent epoxy miscible block and 90 percent epoxy resin immiscible polyalkylene oxide block.

Small amounts of homopolymers from each of the respective block segments may be present in the final amphiphilic polyether block copolymer of the present invention. For example, from 1 weight percent to 50 weight percent, preferably from 1 weight percent to 10 weight percent, of a homopolymer that is similar or identical in structure with the miscible or the immiscible block can be added to the composition of the present invention comprising an epoxy monomer system and an amphiphilic polyether block copolymer.

The amount of amphiphilic polyether block copolymers employed in the epoxy resin composition of the present invention depends on a variety of factors including the equivalent weight of the polymers, as well as the desired properties of the products made from the composition. In general, the amount of amphiphilic polyether block copolymers employed in the present invention may be from 0.1 weight percent to 30 weight percent, preferably from 0.5 weight percent to 15 weight percent and, most preferably, from 2 weight percent to 8 weight percent, based on the weight of the resin composition.

The amphiphilic polyether block copolymers of the present invention preferably increase the toughness or fracture resistance of the epoxy resin, preferably at low loadings of block copolymer (for example less than 10 weight percent) in the epoxy resin composition. Generally, addition of from 1 wt percent to 10 wt percent of a polyether block copolymer to the epoxy resin composition increases the toughness of the resin composition by a factor of 1.5 times to 2.5 times that of a control.

The present invention epoxy resin composition may contain at least one or more amphiphilic polyether block copolymers mixed with the epoxy resin. In addition, two or more different amphiphilic block copolymers may be blended together to make up the block copolymer component of the present invention so long as one of the block copolymers is a polyether block copolymer. More than one block copolymer can be combined to gain additional control of the nanostructure, that is, shape and dimension.

In addition to the polyether block copolymer used in the present invention, other amphiphilic block copolymers may be used as a secondary block copolymer component in the resin composition of the present invention. Examples of additional amphiphilic block copolymers, other than the polyether block copolymers of the present invention, which can be employed in the practice of the present invention include for example, but are not limited to, poly(ethylene oxide)-b-poly (ethylene-alt propylene) (PEO-PEP), poly(isoprene-ethylene oxide) block copolymers (PI-b-PEO), poly(ethylene propylene-b-ethylene oxide) block copolymers (PEP-b-PEO), poly (butadiene-b-ethylene oxide) block copolymers (PB-b-PEO), poly(isoprene-b-ethylene oxide-b-isoprene) block copolymers (PI-b-PEO-PI), poly(isoprene-b-ethylene oxide-b-methylmethacrylate) block copolymers (PI-b-PEO-b-PMMA); and mixtures thereof. Generally, the amount of secondary amphiphilic block copolymer used in the resin composition may be from 0.1 weight percent to 30 weight percent.

The polyether block copolymers of the present invention provide uniformly dispersed and uniformly scaled nano-sized structures which preferably form (template) in the liquid resin matrix due to micellization brought by the balance of immiscibility of one block segment and miscibility of the other block segment. The micellar structures are preserved into the cured epoxy thermoset, or form during the curing process, producing epoxy thermoset materials exhibiting improved toughness, improved fracture resistance, and improved impact resistance while maintaining Tg, modulus and other properties at the same level as the unmodified epoxy thermoset. The micellar morphology of the nano-templated resin can be for example, spherical, worm-like, and vesicles. Micellar morphologies are advantageously obtained at low (for example, less than 5 weight percent) concentrations of block copolymers; that is, the morphological features are not associated with one another or packed into a three dimensional lattice. At higher concentrations self-assembled structures can form spherical, cylindrical, or lamellar morphological features that are associated with one another by lattice interactions, also at a manometer size scale.

It is believed that the increase in fracture resistance occurs when the block copolymers self-assemble into a nanoscale morphology such as worm-like, vesicle or spherical micelle morphology. While it is not well understood how to predict which micelle morphology, if any, will occur in different resins, it is believed that some of the factors that determine the self-assembled morphology may include, for example, (i) the choice of monomers in the block copolymer, (ii) the degree of asymmetry in the block copolymer, (iii) the molecular weight of the block copolymer, (iv) the composition of the thermosetting resin, and (v) the choice of curing agent for the resin. Apparently, a nanoscale morphology plays an important role in creating toughness in an epoxy resin product of the present invention.

As an illustration of one embodiment of the present invention, a thermosetting resin, such as an epoxy resin, may be blended with a polyether block copolymer, for example, a poly(ethylene oxide)-b-poly(butylene oxide) (PEO-PBO) diblock copolymer wherein the PBO is the epoxy immiscible hydrophobic soft component of the diblock copolymer and the PEO is the epoxy miscible component of the diblock copolymer. The curable epoxy resin composition including the PEO-PBO diblock copolymer increases the impact resistance of the cured epoxy resin body.

The PEO-PBO diblock copolymer can be indicated generally by the chemical formula $(PEO)_x-(PBO)_y$ wherein the subscripts x and y are the number of monomer units of polyethylene oxide and polybutylene oxide in each block, respectively and are positive numbers. Generally, x should be from 15 to 85 and the molecular weight of the structural part $(PEO)_x$ should be from 750 to 100,000. Subscript y should be from 15 to 85 and the molecular weight represented by the structural part $(PBO)_y$ should be from 1,000 to 30,000. Also, a single PEO-PBO diblock copolymer may be used alone, or more than one PEO-PBO diblock copolymer may be combined to be used as well.

In one embodiment of the present invention, a PEO-PBO diblock copolymer is used wherein the diblock copolymer has 20 percent PEO and 80 percent PBO to 80 percent PEO and 20 percent PBO; and has block sizes of molecular weights (Mn) of PO 2000 or higher and molecular weight of PEO 750 or higher; and provides various self-assembled morphologies. For example, the present invention includes a diblock with a PBO block length of from 2,500 to 3,900 that provides spherical micelles. Another example of the present invention includes a diblock with a PBO segment of 6,400 that provides worm-like micelles. Still another example of the present invention is a diblock with a short (Mn=750) PEO block segment that provides an agglomerated vesicle morphology. Yet another example of the present invention includes a mixture of a PEO-PBO diblock with a low molecular weight PBO homopolymer that provides a spherical micelle in which the PBO homopolymer sequesters into the micelle without forming a separate macrophase; the PBO homopolymer macrophase separates when added without the diblock present.

In general, the amphiphilic block copolymers used in the present invention can be prepared in a single sequential synthetic polymerization process, wherein one monomer is polymerized to prepare an initial block, followed by simple introduction of the second monomer type which is then polymerized onto the terminus of the first block copolymer until the polymerization process is complete. It is also possible to make the blocks separately, preparing the first block and then polymerizing the second block onto the terminus of the first block in a second synthetic step. The difference in solubility of the two block fragments is sufficient that the block copolymer may be used to modify a variety of epoxy materials. The block copolymers can be prepared by Group I metals such as sodium, potassium or cesium moderated anionic polymerization. The polymerization can be carried out neat or using a solvent. The temperature of the polymerization reaction can be for example from 100° C. to 140° C. at atmospheric pressure to slightly above atmospheric pressure. The synthesis of the block copolymer may be carried out, for example, as described in Whitmarsh, R. H. In Nonionic Surfactants Polyoxyalkylene Block Copolymers; Nace, V. M., Ed.; Surfactant Science Series; Vol. 60; Marcel Dekker, N.Y., 1996; Chapter 1.

In a preferred embodiment, the block segments of the block copolymers are prepared by the ring-opening polymerization of 1,2-epoxy alkenes.

A thermoset material is defined as being formed of polymer chains of variable length bonded to one another via covalent bonds, so as to form a three-dimensional network. Thermoset epoxy materials can be obtained, for example, by reaction of a thermosetting epoxy resin with a hardener such as of the amine type.

Epoxy resins useful in the present invention include a wide variety of epoxy compounds. Typically, the epoxy compounds are epoxy resins which are also referred to as polyepoxides. Polyepoxides useful herein can be monomeric (for example, the diglycidyl ether of bisphenol A, novolac-based epoxy resins, and tris-epoxy resins), higher molecular weight advanced resins (for example, the diglycidyl ether of bisphenol A advanced with bisphenol A) or polymerized unsaturated monoepoxides (for example, glycidyl acrylates, glycidyl methacrylate, allyl glycidyl ether, etc.), homopolymers or copolymers. Most desirably, epoxy compounds contain, on average, at least one pendant or terminal 1,2-epoxy group (that is, vicinal epoxy group) per molecule.

Examples of useful polyepoxides include the polyglycidyl ethers of both polyhydric alcohols and polyhydric phenols; polyglycidyl amines; polyglycidyl amides; polyglycidyl imides; polyglycidyl hydantoins; polyglycidyl thioethers; epoxidized fatty acids or drying oils, epoxidized polyolefins, epoxidized di-unsaturated acid esters; epoxidized unsaturated polyesters; and mixtures thereof. Polyepoxides can also be manufactured by reacting diglycidyl ethers with isocyanates so as to obtain an epoxy-terminated oligomer containing an oxazolidone structure for example, the reaction products of a diglycidyl ether of bisphenol-A and MDI.

Numerous polyepoxides prepared from polyhydric phenols include those which are disclosed, for example, in U.S. Pat. No. 4,431,782. Polyepoxides can be prepared from mono-, di- and tri-hydric phenols, and can include the novolac resins. Polyepoxides can include the epoxidized cyclo-olefins; as well as the polymeric polyepoxides which are polymers and copolymers of glycidyl acrylate, glycidyl methacrylate and allylglycidyl ether. Suitable polyepoxides are disclosed in U.S. Pat. Nos. 3,804,735; 3,892,819; 3,948,698; 4,014,771 and 4,119,609; and Lee and Neville, Handbook of Epoxy Resins, Chapter 2, McGraw Hill, N.Y. (1967).

While the present invention is applicable to polyepoxides in general, preferred polyepoxides are glycidyl polyethers of polyhydric alcohols or polyhydric phenols having an epoxide equivalent weight (EEW) of from 150 to 3,000; preferably an EEW of from 170 to 2,000. These polyepoxides are usually made by reacting at least two moles of an epihalohydrin or glycerol dihalohydrin with one mole of the polyhydric alcohol or polyhydric phenol, and a sufficient amount of a caustic alkali to combine with the halohydrin. The products are characterized by the presence of more than one epoxide group, that is, a 1,2-epoxy equivalency greater than one.

The polyepoxide useful in the present invention can also be a cycloaliphatic diene-derived epoxide. These polyepoxides can be cured either thermally, cationically or photoinitiation (example UV initiated cure). There are several cycloaliphatic epoxides that are made and marketed by The Dow Chemical Company such as 3,4-epoxycyclohexylmethyl-3,4-epoxycyclohexyl carboxylate; 1,2-epoxy-4-vinylcyclohexane; bis(7-oxabicyclo[4.1.0]hept-3-ylmethyl hexanedioic acid ester; 3,4-epoxycyclohexanecarboxylate methyl ester; and mixtures thereof.

Generally, the amount of polyepoxide used in the present invention may be in the range of from 30 weight percent to 95 weight percent.

The curing agent component (also referred to as a hardener or cross-linking agent) useful in the present invention may be any compound having an active group being reactive with the epoxy group of an epoxy resin. The chemistry of such curing agents is described in the previously referenced books on epoxy resins. The curing agent useful in the present invention includes nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; and catalytic curing agents such tertiary amines, Lewis acids, Lewis bases and combinations of two or more of the above curing agents.

Preferred suitable curing agents comprise but are not limited to, dicyanodiamide (DICY), its derivate and adducts such as o-tolyl biguanide (OTB); amino group containing compounds, imidazoles and adduct of imidazoles, phenolic resins such bisphenol-A based, phenol novolac or cresol-novolac phenolic resins; carboxyl functional resins such as polyester and acrylic resins, blocked isocyanates, anhydrides and others.

Practically, polyamines, dicyandiamide, diaminodiphenylsulfone and their isomers, aminobenzoates, various acid anhydrides, phenol-novolac resins and cresol-novolac resins, for example, may be used in the present invention, but the present invention is not restricted to the use of these compounds.

Generally, the amount of curing agent used in the present invention may be in the range of from 1 weight percent to 70 weight percent.

An optional component useful in the present invention is a curing catalyst which can be added to the epoxy resin composition. Examples of curing catalysts include imidazole derivatives, tertiary amines, and organic metallic salts. Preferably, the curing catalyst is used in an amount of from 0 6 parts by weight based on the total weight of the curable composition.

The curable epoxy resin composition according to the present invention may also contain additives such as fillers, dyes, pigments, thixotropic agents, photo initiators, latent catalysts, inhibitors, additives to modify specific processing or coating properties such as flow modifiers, accelerators, desiccating additives, surfactants, adhesion promoters; surfactants, fluidity control agents, stabilizers, additives that aid in processing, adhesion promoters, flexibilizers, and fire retardants; and any other substances which are required for the manufacturing, application or proper performance of the powder coating. The amount of the optional additives used in the epoxy resin composition generally may be from 0 weight percent to 70 weight percent depending on the final formulation.

The fillers that may be used in the present invention can include for example, wollastonite, barites, mica, feldspar, talc, calcium carbonate; and pigments such as titanium dioxide, carbon black, iron oxides, chrome oxide, organic pigments and dyes.

In the preparation of the blend or composition of the present invention, the components are mixed together by known means in the art at conditions to form a curable composition. The curable epoxy resin composition of the present invention can be produced by mixing all the components of the composition together in any order.

Alternatively, the curable resin composition of the present invention can be produced by preparing a first composition comprising the epoxy resin component and block copolymer; and a second composition, for example, comprising the curing agent component.

In yet another embodiment, the curable resin composition of the present invention can be produced by preparing a first composition comprising the epoxy resin component; and a second composition, for example, comprising the block copolymer and curing agent component. All other components useful in making the resin composition may be present in the same composition, or some may be present in the first composition, and some in the second composition. The first composition is then mixed with the second composition to form the curable resin composition. The curable resin composition mixture is then cured to produce a thermoset epoxy resin material.

An alternative method of making the toughening resin of the present invention includes incorporating the toughening agent directly into an epoxy resin advancement reactor during the resin manufacturing step. In this embodiment, the composition of the present invention includes a liquid epoxy resin such as a diglycidyl ether of bisphenol A, a polyhydric alcohol such as bisphenol-A and a toughening agent such as an EO/BO block copolymer.

If the processing of the epoxy resin includes an advancement step, the toughening agent (copolymers) can be added with the reactants prior to the advancement reaction. The copolymer can be added at the beginning of the process especially when the resin is a liquid and can be taken through the entire advancement process in order to make an SER. This modified SER can be used in combination with other powder coating materials.

Still another alternative method of making the toughened resin of the present invention includes incorporating the toughening agent into the curing agent used to cure the epoxy resin.

The toughening agent can be used in concentrations of from 0.5 w/w percent to 10 w/w percent based on the formulated solids content of the cured epoxy system used in the powder coating application, preferably between 2 w/w percent and 6 w/w percent. The concentration of the toughening agent in the resin can be adjusted to provide the desired concentration in the final formulation or can be kept at higher concentration (master batch) and adjusted down with unmodified resin to desired final concentration.

The present invention consists of blends of a solid epoxy resin suitable for making powder coatings with a toughening agent which can be for example an EO/BO block copolymer or any other copolymer of similar structure. The epoxy resin is melted, mixed with the toughening additive, re-solidified and crushed prior to being incorporated into the powder coating manufacturing.

The curable epoxy resin composition containing the polyether block copolymers of the present invention is used for preparing a powder coating composition. The powder coating composition is then used to provide a coating on various substrates.

The powder coating composition may be applied to a substrate by any well known methods such as electrostatic spraying, fluidized bed, electromagnetic brush, powder cloud or by spraying the powder with conventional powder spraying equipment onto the pre-heated substrate with or without electromagnetic charging the powder (this method is also known as fusion bonded process).

The mixture of epoxy resin, curing agent, block co-polymer and any other modifiers present in the composition can be cured according to typical processes practiced by the industry. The temperature of curing can range generally from 10° C. to 200° C. These processes include ambient temperature cure (for example, 20° C.) to elevated temperature cures (for example, from 100° C. to 200° C.) using thermal, radiation or a combination of energy sources.

As is generally known, the time of cure may range generally from seconds to several hours depending on the curing agent and the components in the resin compositions. Typically, the time of curing may be, for example, from 1 minute to 30 minutes.

The curable composition can be cured in one step or multiple steps or the curable composition can be post-cured using a different temperature or energy source after the initial cure cycle.

The following working examples are given to illustrate the invention and should not be construed as limiting its scope. Unless otherwise indicated, all parts and percentages are by weight.

Some of the raw materials used in the Examples were as follows:

"Modified Resin" is a solid epoxy resin which has been modified with a block copolymer toughening agent of the present invention.

D.E.R.*662E is a solid epoxy resin having an EEW of 550 and commercially available from The Dow Chemical Company.

D.E.R.*664UE is a solid epoxy resin having an EEW of 900 and commercially available from The Dow Chemical Company.

"DICY" stands for dicyanodiamide and used as a curing agent.

Amicure™ CG 1200 is a DICY curing agent commercially available from Air Products.

EPICURE™ 101 is an imidazole adduct commercially available from Resolution Performance Polymers; and is used as an accelerator.

Resinflow™ P67 is an acrylic flow agent commercially available from Estron.

NYAD™ #325 is wollastonite #325 filler commercially available from NYCO.

Cab-O-Sil™ M5 is fumed silica commercially available from Cabot; and is used as a fluidizing agent.

"PEO-PBO" stands for a poly(ethylene oxide)-b-poly(butylenes oxide) diblock copolymer.

"PEO-PBO-PEO" stands for a poly(ethylene oxide)-poly(butylenes oxide)-poly(ethylene oxide) triblock copolymer.

PREPARATORY EXAMPLE A

Preparation of PEO-PBO-PEO Triblock Copolymer

The basic procedure used to make the PEO-PBO-PEO triblock copolymer is based on Example 1 of U.S. Pat. No. 5,600,019. The modifications to this procedure are listed below. The final PEO-PBO-PEO triblock product contained the following molar ratio of initiator/monomers.

1 mole propylene glycol/56 moles butylene oxide/62 moles of ethylene oxide

Part A: Preparation of Catalyzed Initiator

Propylene glycol was used in placed of Dowanol DM. In addition, an aqueous solution of KOH (46 weight percent solids) was used. The KOH was added in an amount to give a final catalyst concentration of 9 weight percent. The water was not removed from the reaction product.

Part B: Preparation of Butylene Oxide Polymer

The butylene oxide was added in two batches. The amount of butylene oxide was adjusted so that the intermediate butylene oxide block had number average molecular (Mn) of approximately 1000. When digestion was complete more of the aqueous KOH (46 weight percent) was added so that the final catalyst concentration was approximately one weight percent. The water was removed under vacuum then additional butylene oxide was added to give the final butylene oxide polymer. The final butylenes oxide polymer had a number average molecular weight of approximately 3500.

Part C: Preparation of Final PEO-PBO-PEO Triblock Copolymer

In order to obtain a liquid product, a mixture of ethylene oxide and butylene oxide (80/20 weight percent) was added to the butylene oxide prepared in Part B above. The incorporation of a small amount of butylene oxide in this step helps to disrupt the tendency of PEO to crystallize and form a solid. The amount of this mixture that was added was adjusted so that the final triblock had a number average molecular weight of approximately 6800 g/mole. The final reaction mixture was cooled to 60° C. then neutralized through a magnesium silicate bed to give the final PEO-PBO-PEO triblock copolymer.

EXAMPLE 1 AND COMPARATIVE EXAMPLE A

Part A: Preparation of Toughened Resin

A 930 gram (g) sample of DER 664UE flaked solid epoxy resin was added to a 2 L reactor and heated to 180° C. until the solid epoxy resin was completely molten (fluid).

70.2 g of PEO-PBO-PEO triblock copolymer, prepared as described in PREPARATORY EXAMPLE A above process, was added to the molten resin and stirred for 15 minutes.

The resulting molten material was poured on a aluminum foil pan and allowed to cool to ambient temperature (25° C.). The molten material solidified at ambient temperature. Then, the solid material was crushed to ¼ inch (6 mm) flake pieces with a grinder, and the crushed particles were added to the other ingredients of the formulation described in Table 1.

TABLE 1

| Powder Coating Composition | Example 1 (Toughened System) (g) | Comparative Example A (Control) (g) |
|---|---|---|
| Components | | |
| Modified Resin | 804.5 | 0 |
| D.E.R. 662E Epoxy Resin | 132.1 | 152.2 |
| DER 664UE Epoxy Resin | 0 | 862.5 |
| Amicure CG 1200 DICY | 12.9 | 15.7 |
| EPICURE P101 | 10.4 | 12.0 |
| Resinflow P67 | 6.5 | 7.5 |
| NYAD #325 | 390.1 | 450.2 |
| Cab-O-Sil M5 [1] | 6.5 | 6.5 |
| Properties | | |
| Cracks per coated bar | 0 cracks | 15 cracks |
| Tg (° C.) | 117.24 | 116.61 |

[1] Post added to the powder coatings.

Part B: Preparation of Powder Coating

The formulations described in Table 1 above were weighed in a semi-analytical scale and pre-blended in a high intensity mixer PRIZM PILOT 3 for 30 seconds at 2300 rpm.

The pre-blended material was then extruded through a PRIZM 24 mm extruder using 35° C. in the feed zone of the extruder, 70° C. in the middle zone of the extruder and 90° C. in the head of the extruder at 400 rpm. The extruded material was fed to a chilled roll and then passed through a crusher, reducing the chilled material to flakes. The crushed flakes were then fed to a Hosokawa Micropul ACM-2 mill and reduced to a powder of approximately 43 micron average particle size.

Part C: Powder Coating Application 1 inch×6 inches×⅝ inch (2.5×15.0×1.6 centimeters) cold rolled steel bars were prepared by shot blasting with steel grit to a white metal finish with and anchoring profile between 2.5 and 4.5 mils.

The bars were pre-heated to 250° C. for 30 minutes in a convection oven. The bars were then taken out of the oven an immediately dipped in a fluidized bed containing the powder coating prepared in Part B above. The dipping time was controlled to provide a coating on the bars wherein the thickness of the coating was between 14 mils and 16 mils. The coated bars were then taken back to the oven at 250° C. After 2 minutes in the oven, the bars were removed, allowed to cool outside of the oven at ambient temperature for 2 minutes and immersed into a running water bath at also at ambient temperature until cold.

Part D: Testing Procedure and Results

The toughness of the coatings on the coated bars prepared in Part C above, was determined by using a four point bend apparatus as described in NACE Standard RP0394-2002, section H4.3. However, the test method described in NACE Standard RP0394-2002, section H4.3 was modified slightly which included bending the bars to a fixed deformation of 1.5 inches and counting the number of cracks in each bar instead of bending the bars to the point where the first crack appears and measuring the deflection angle. Also, the test was carried out at −38° C. instead of −30° C. to stress the performance difference between the toughened material and the control.

As described in Table 1 above, the toughened coating formulation on the bar (Example 1, present invention) presented zero cracks per bar while the non-toughened coating formulation on the bar (Comparative Example A, control) presented an average of 15 cracks per bar and severe delamination.

The glass transition temperatures of the cured coatings were measured using a TA Instruments DSC Q100. A 10° C./minute temperature ramp from 30° C. to 150° C. was carried out and the Tg was measured considering the inflection point of the glass transition temperature curve. The toughened coating (Example 1) had a Tg of 117.24° C. and the control coating (Comparative Example A) had a Tg of 116.61° C. as set forth in Table 1 above.

A higher flexibility result combined with a practically unchanged Tg value as shown by the Examples in Table 1 above, demonstrates that the resin of the present invention (Example 1) is indeed toughened and not simply plasticized.

What is claimed is:

1. A process for preparing a curable solid resin powder coating composition comprising the steps of:
    (I) melt blending the following components to form a molten modified resin:
        (a) a solid epoxy resin; and
        (b) an amphiphilic block copolymer, wherein the amphiphilic block copolymer is an amphiphilic polyether block copolymer containing at least one epoxy resin miscible block segment and at least one epoxy resin immiscible block segment: wherein the miscible block segment of the amphiphilic block copolymer comprises at least one polyether structure; wherein the immiscible block segment of the amphiphilic block copolymer comprises at least one polyether structure provided that the polyether structure of said immiscible block segment contains at least one or more alkylene oxide monomer units having at least four carbon atoms;
    (II) solidifying the molten modified resin of step (I) to form a solid resin;
    (III) reducing the solid modified resin of step (II) to a powdered material;
    (IV) feeding a mixture of (a) the powder material of step (III), (b) at least one nitrogen-containing curing agent, and an epoxy resin into an extruder;
    (V) extruding the mixture of step (IV) through the extruder to form a molten reaction mixture; and
    (VI) solidifying the molten reaction mixture of step (V) to form a final curable solid resin powder coating composition;
    wherein the amphiphilic block copolymer is present in the composition in an amount of from about 0.1 weight percent to about 15 weight percent based on the weight of the composition; and such that when the epoxy resin composition is cured, the toughness of the resulting cured epoxy resin composition is increased compared to that of a control; and wherein a templated thermoset epoxy polymer composition with a nanoscale self-assembled morphology is formed.

2. The process of claim 1, wherein the nitrogen-containing compound comprises dicyanodiamide, dicyanodiamide derivatives; dicyanodiamide adducts; o-tolyl biguanide; amino group containing compounds; imidazoles; adducts of imidazoles; phenol-formaldehyde resins; amino-formaldehyde resins; phenol; bisphenol A novolacs; cresol novolacs; phenolic-terminated epoxy resins; poly carboxylic acids; dodecanedioic acid; carboxyl functional resins; polyester resins; acrylic resins; blocked isocyanates; blocked anhydrides; catalytic curing agents; tertiary amines; Lewis acids; Lewis bases; or combinations thereof.

3. The process of claim 1, wherein the blend of step (I) includes a flow modifier.

4. The process of claim 1, wherein the amphiphilic polyether block copolymer comprises a diblock structure; a linear triblock structure; a linear tetrablock structure; a higher order multiblock structure; a branched block structure; or a star block structure.

5. The process of claim 1, wherein the miscible block segment contains a polyethylene oxide block, a propylene oxide block, or a poly(ethylene oxide-co-propylene oxide) block; and the immiscible block segment contains a polybutylene oxide block, a polyhexylene oxide block, or a polydodecylene oxide block.

6. The process of claim 1, wherein the at least one of the miscible segments of the amphiphilic block copolymer is a poly(ethylene oxide);
    and the at least one of the immiscible segments of the amphiphilic block copolymer is a poly(butylene oxide).

7. The process of claim 1, wherein the amphiphilic block copolymer is poly(ethylene oxide)-poly(butylene oxide) or poly(ethylene oxide)-poly(butylene oxide)-poly(ethylene oxide).

8. The process of claim 1, wherein the amphiphilic block copolymer has a molecular weight of from 1000 to 50,000.

9. The process of claim 1, wherein the ratio of the miscible segments of the amphiphilic block copolymer to the miscible segments of the amphiphilic block copolymer is from 10:1 to 1:10.

10. The process of claim 1, wherein the epoxy resin comprises polyglycidyl ethers of polyhydric alcohols, polyglycidyl ethers of polyhydric phenols, polyglycidyl amines, polyglycidyl amides, polyglycidyl imides, polyglycidyl hydantoins, polyglycidyl thioethers, epoxidized fatty acids, epoxidized drying oils, epoxidized polyolefins, epoxidized di-unsaturated acid esters, epoxidized unsaturated polyesters, epoxy-isocyanate resins containing oxazolidone groups, or mixtures thereof.

11. The process of claim 1, wherein the epoxy resin comprises a glycidyl polyether of a polyhydric alcohol or a glycidyl polyether of a polyhydric phenol.

12. The process of claim 1, wherein the blend of step (I) includes a homopolymer of identical composition to the epoxy immiscible block segment.

13. The process of claim 1, wherein the blend of step (I) includes a homopolymer of identical composition to the epoxy miscible block segment.

14. The process of claim 1, wherein the solid epoxy resin has an epoxide equivalent weight of from 150 to 3000.

15. The process of claim 1, wherein the blend of step (I) includes a curing catalyst.

16. The process of claim 15, wherein the curing catalyst is selected from the group consisting of imidazole derivatives, tertiary amines, phosphine compounds, phosphonium compounds, iminium compounds, organic metallic salts and mixtures thereof.

17. A process for preparing a coated substrate comprising:
(I) contacting a substrate with a curable solid resin powder coating composition prepared by the process of claim 1; and
(II) heating the powder coating composition at a temperature sufficient to cure the composition.

18. A coated article made by the process of claim 17.

* * * * *